(12) United States Patent
Ruocco-Angari

(10) Patent No.: US 7,500,367 B2
(45) Date of Patent: Mar. 10, 2009

(54) COOLED CRYOSTAT DEVICE

(75) Inventor: Bernard Ruocco-Angari, Paris (FR)

(73) Assignee: Sagem Defense Securite, Paris (FR)

( * ) Notice: Subject to any disclaimer, the term of this patent is extended or adjusted under 35 U.S.C. 154(b) by 434 days.

(21) Appl. No.: 11/346,611

(22) Filed: Feb. 2, 2006

(65) Prior Publication Data

US 2007/0084221 A1    Apr. 19, 2007

(51) Int. Cl.
*F25B 19/00*   (2006.01)
*F25B 9/00*   (2006.01)
(52) U.S. Cl. ............................................. 62/51.1; 62/6
(58) Field of Classification Search ................... 62/51.1, 62/6
See application file for complete search history.

(56) References Cited

U.S. PATENT DOCUMENTS

| | | | | |
|---|---|---|---|---|
| 3,291,005 | A | * | 12/1966 | Anderson ..................... 92/100 |
| 4,194,119 | A | | 3/1980 | MacKenzie |
| 4,325,530 | A | * | 4/1982 | Niemann et al. ............. 248/317 |
| 4,363,217 | A | * | 12/1982 | Venuti ......................... 62/55.5 |
| 4,451,735 | A | | 5/1984 | Diedrich et al. |
| 4,796,432 | A | * | 1/1989 | Fixsen et al. ................. 62/51.1 |
| 4,854,131 | A | * | 8/1989 | Sakitani et al. ............... 62/51.2 |
| 4,918,312 | A | * | 4/1990 | Wellman et al. ............. 250/352 |
| 4,995,236 | A | | 2/1991 | Rouquier et al. |
| 5,119,637 | A | * | 6/1992 | Bard et al. .................... 62/51.2 |
| 5,376,794 | A | * | 12/1994 | Gross et al. .................. 250/352 |
| 5,379,602 | A | | 1/1995 | Sipila et al. |
| 5,966,945 | A | * | 10/1999 | Mengel et al. ............... 62/51.1 |
| 6,070,414 | A | | 6/2000 | Ross et al. |

FOREIGN PATENT DOCUMENTS

EP        0 494 001 A1      7/1992

* cited by examiner

*Primary Examiner*—William C Doerrler
(74) *Attorney, Agent, or Firm*—McDonnell Boehnen Hulbert & Berghoff LLP

(57) ABSTRACT

A cooled cryostat device comprising: a cold finger having infrared detector means secured to the end thereof; an outer casing surrounding the cold finger; and stiffener means for stiffening the cold finger and interposed between the outer casing and the cold finger in the vicinity of the end thereof. The stiffener means comprising: first eyelets provided on the inside of the casing and around its periphery; second eyelets provided on the outside of the cold finger around its periphery; the first and second eyelets being mutually angularly offset; and a cable tensioned around a closed loop between the outer casing and the cold finger and passing freely through the first and second eyelets, with the cable, once the cold finger has been placed in a balanced situation, itself being secured to the outer casing and to the cold finger.

6 Claims, 2 Drawing Sheets

COOLED CRYOSTAT DEVICE

This application claims priority under 35 U.S.C. § 119, via the Paris Convention for the Protection of Industrial Property, to French patent application number FR 05 01098, filed Feb. 03, 2006, which is hereby incorporated by reference.

FIELD OF THE INVENTION

The present invention relates to improvements provided to cooled cryostat devices.

DESCRIPTION OF THE PRIOR ART

The operating temperature requirements and the constraints associated with using cryogenerators (of the Stirling, Joule-Thomson, or other types) have caused cooled cryostats in the state of the art to converge on a typical configuration:
- a cold finger having infrared detector means secured to the end thereof, i.e. means for detecting infrared radiation and associated accessories (screens, baffles, filters, . . . ); and
- an outer casing surrounding said cold finger.

The cold finger is generally a metal tube of small diameter, small thickness, and great length, so as to reduce heat losses by conduction between the focal plane at cryogenic temperature and the outer casing at ambient temperature.

The assembly constituted by the cold finger and its "payload" (detector means, in particular detector with its accessories) generally has a first resonant mode of vibration at a relatively low frequency (typically 500 to 1500 Hz). This characteristic is difficult to make compatible with the mechanical environments that are to be found in particular in military applications (environmental vibratory spectra up to 2 kHz, or even above; root mean square (rms) acceleration levels up to 10 g, or even more).

For applications involving a severe mechanical environment, it is necessary to stiffen the cold finger so as to increase its first resonant frequency. The idea is to limit the displacements of the detector relative to the mechanical reference positions and to increase reliability (stability of the optical axis).

The most conventional manner of stiffening a cold finger is to add rigid cross-beams which connect the cold finger, in particular in the vicinity of its free end, to the outer casing. Using stiffeners makes it possible to eliminate the bending mode of the cold finger. To clarify ideas, in a typical example of an arrangement for a crysotatic device, the first resonant mode of the cold finger lies around 1350 Hz when the finger is free, but rises to 3189 Hz when the cold finger is stiffened by means of stiffeners, i.e. is moved out from the spectral band of the mechanical environment (about 5 Hz to 2000 Hz). This provides the desired stability for the focal plane of the cryostatic device.

Nevertheless, that known solution presents two main drawbacks: it increases heat losses from cryostats, and it increases their manufacturing cost.

With reference firstly to heat losses, stiffeners act as thermal short circuits between the cold zones and the hot zones of the cryostat. Even if they are made of materials having low thermal conductivity, such stiffeners significantly increase the thermal losses of cryostats. By way of example, adding four stiffeners in one known cryostat (using borosilicate glass having a diameter of 1 mm and a length of about 15 mm) has caused losses to go from about 100 mW to about 150 mW (i.e. to increase by about +50%). This increase in heat losses leads to an increase in the consumption of the refrigerating machinery of about 1 W. Since that known cryostat is used mainly in portable applications where electricity consumption is critical, it was not possible to implant stiffeners. The drawback of not having stiffeners is a first resonant mode of the cold finger lying close to 580 Hz, thus putting a limit on performance (stability of the optical axis) in a vibratory environment in non-portable applications of that device.

Referring now to cost, stiffeners are difficult to make and put into place, and so they are expensive. The materials used (typically glass) are expensive to manufacture and shape. They can be made in simple shapes only. That is why it is generally preferred to use a plurality of individual stiffeners of simple shape (typically four cylindrical rods) rather than a single part of more complex shape (e.g. a star having several points). This increase in the number of parts and the number of assembly operations has an unfavorable effect on the cost of manufacture.

It should also be emphasized that in the present state of the art, stiffeners in the form of rods of the kind mentioned above are not dimensioned to satisfy the requirements of their main function, which is to increase the frequency of the first resonant mode of the cold finger. Their dimensions are generally the result of considerations associated with feasibility in terms of manufacture and assembly. They are generally much thicker than they need be in order to perform their mechanical function.

A system of filamentary stays working solely in traction (like the rigging in a sail boat or a biplane aircraft) could perform the same function using sections that are much smaller. Nevertheless, attempts at implementing such a solution on a practical basis have encountered difficulties of another kind: installing and adjusting the tension of individual stays around a cold finger is even more difficult than putting individual stiffeners into place for working in compression. The stays must be adjusted so as to be capable of obtaining the desired stiffness, but without deforming the cold finger. Finally, the difficulties of individually adjusting the stays are such that that solution has not been implemented in practice.

FIELD OF THE INVENTION

An object of the invention is to provide an improved solution that enables the basic problem of providing effective stiffening to the cold finger to be solved while avoiding the drawbacks of the solutions that are presently known.

For these purposes, the invention provides a cooled cryostat device comprising:
- a cold finger having infrared detector means secured to the end thereof;
- an outer casing surrounding said cold finger; and
- stiffener means for stiffening the cold finger and interposed between the outer casing and the cold finger in the vicinity of the end thereof;

which device is characterized, when arranged in accordance with the invention, in that the stiffener means comprise:
- first eyelets provided on the inside of the casing and distributed around the periphery thereof;
- second eyelets provided on the outside of the cold finger and distributed around the periphery thereof;
- the first eyelets and the second eyelets being mutually angularly offset; and
- a cable tensioned around a closed loop between the outer casing and the cold finger, passing freely through the first and second eyelets, said cable, once the cold finger has been placed in a balanced situation, being secured to the outer casing and to the cold finger.

Thus, in the context of the invention, the above-mentioned advantage of stiffening by means of stays is conserved, in particular very low thermal conductivity between the cold finger and the associated casing. Nevertheless, the solution of the invention avoids individual stays that are too difficult to adjust individually and makes use of a continuous cable relative to which the cold finger can move while the cable is being tensioned. This option for relative displacement between the cold finger and the cable makes it possible to ensure that the tension in each strand of the cable is balanced in almost automatic manner since the stay-forming strands are no longer independent of one another, but are secured to one another and can slide relative to the cold finger.

In a preferred embodiment, the first eyelets belong to a first ring suitable for being secured to the inside of the outer casing, and the second eyelets belong to a second ring suitable for securing around the cold finger. In which case, advantageously, the two rings and the cable uniting them form a subassembly that is preassembled prior to being assembled in the device. This provides increased simplicity during manufacture and then assembly: the subassembly as made in this way is installed in the cryostat with the outer ring secured to the inside face of the outer casing of the cryostat and with the inner ring secured on the outside of the cold finger. The respective positions of the two rings relative to the longitudinal axis of the cryostat determine the tension in the cable. Tensioning is thus determined during assembly. Because the cable can slide, the tension between the various stays or "spokes" reaches balanced equilibrium. After the two rings have been put into place and tension adjusted, it is necessary to prevent the cable from moving at a few points, e.g. using spots of solder or adhesive.

The rings can be secured to their respective supports in any suitable manner. In particular, provision can be made for the first and/or second ring to be made of metal and to be welded or soldered in the outer casing or on the cold finger. Provision can also be made for the first and/or second ring to be bonded inside the outer casing or on the cold finger by adhesive.

It is emphasized that the cable works in traction and that its section can be small, thereby greatly limiting thermal losses via the cable. Several options are available for making the cable, both concerning the nature of the material from which it is made and concerning its diameter, thereby enabling the compromise between stiffness and thermal losses to be improved.

Thus, provision can be made for the cable to be made of metal (e.g. steel,. pure titanium, TA6V4 titanium alloy, nickel, molybdenum, . . . ). It is also possible to provide for the cable to be made of synthetic material, e.g. of polymers (polyaramides such as those sold under the names Kevlar or Nomex, . . . ), or of composites, materials that generally present very low thermal conductivity and good mechanical properties. In addition, the cable can be of very small diameter, a few tenths of a millimeter down to 0.025 mm for metals (in particular when using surgical wire or electroerosion wire) and down to a few tenths of a millimeter for polymers and composites, which can be in the form of a single strand or braided, of section that is round or flat, . . . .

To obtain a concrete idea, if use is made of a yarn that is made of Kevlar (conductivity 0.04 watts per meter kelvin (W/m. ° K)) having a diameter of 0.6 mm, in an assembly of four stiffeners each having a length of about 15 mm, the heat losses in a cryostat of the type mentioned in the introduction are less than 1 mW, i.e. about one-fiftieth the losses in the conventional solution.

With heat losses minimized in this way, both performance criteria: minimum heat loss (normally obtained without using stiffeners) and maximum stiffness (normally obtained with stiffeners), can be obtained simultaneously.

The rings are metal parts that are simple and that can be made at very low cost (stamped metal, sintered ceramic, . . . ) producing shapes that are relatively complex. Numerous types of fastener eyelet (crimped or welded) enabling the cable to be secured to the rings are commercially available or can be produced at minimal cost without technical difficulty. The subassembly constituted by the rings and the cable can be assembled using a workforce that is less qualified and in an environment that is less expensive than the clean room used for assembling cryostats. Finally, installing the stiffener subassembly in the cryostat is simpler than assembling multiple individual stiffeners. The overall cost of the solution proposed in accordance with the invention is less than that of the above-mentioned conventional solution.

Since the inner ring is connected to the cold finger, its thermal mass is additional to that of all of the other elements carried by the cold finger. This is not a drawback compared with the conventional solution since conventional massive stiffeners themselves present a thermal mass that is in part added to that of the cold finger. In addition, it is possible to envisage the inner ring being worked in such a manner as to minimize its mass, or indeed being used to perform other functions (cabling relay holder, cold screen support, . . . ) in order to limit or diminish the total thermal mass.

Finally, as in the conventional solution, it is emphasized that the stiffener subassembly connects a hot portion (the cryostat casing) to a portion (the cold finger) that is hot or cold depending on whether the cryostat is or is not in operation. The tension in the spokes can thus be affected by the differential expansion between the respective component materials. Advantage can be taken of this phenomenon to increase stiffness when temperature is low since the shortening of the cold finger under the effect of temperature tends to tension the spokes.

BREIF DESCRIPTION OF THE DRAWINGS

The invention can be better understood on reading the following detailed description of certain preferred embodiments given solely as non-limiting examples. In the description, reference is made to the accompanying drawings, in which.

Figure 1A:
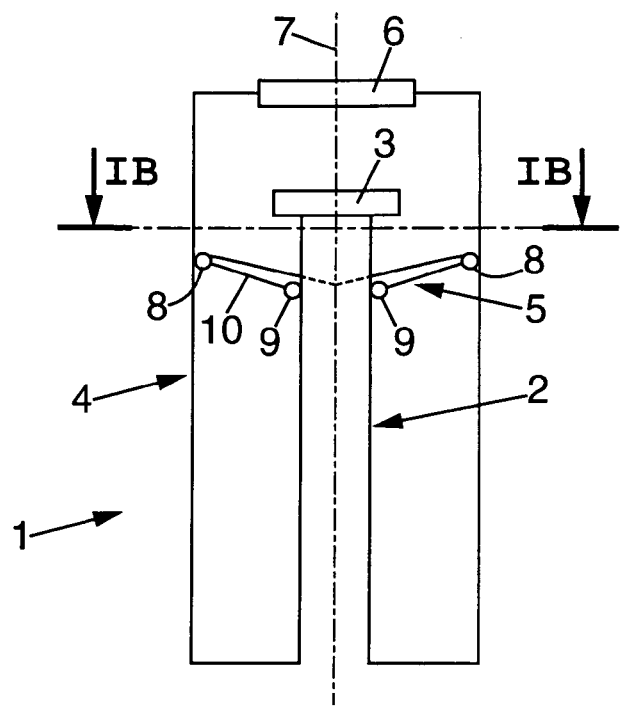
FIG. 1A is a highly diagrammatic side view of a cooled cryostat device arranged in accordance with the invention.
Figure 1B:
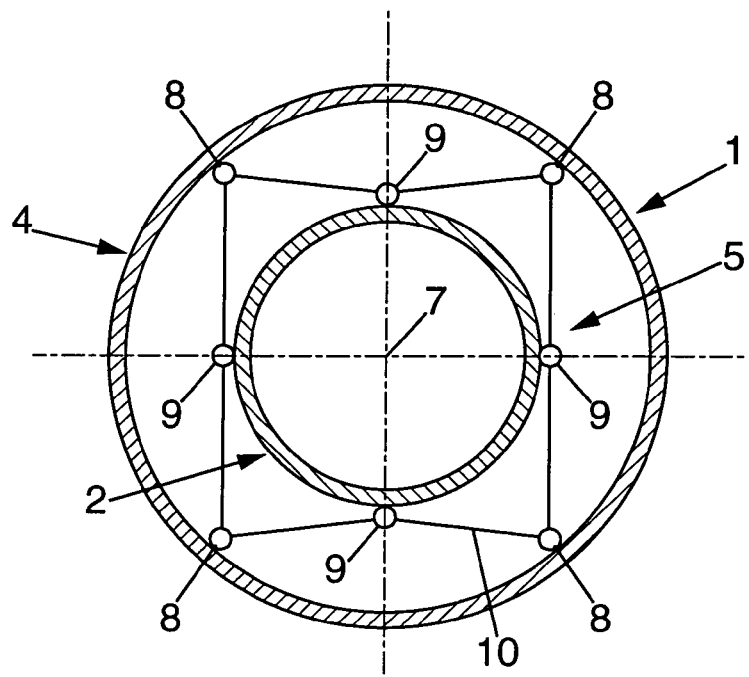
FIG. 1B is a plan view in section on line IB-IB of the device of FIG. 1A.
Figure 2A:
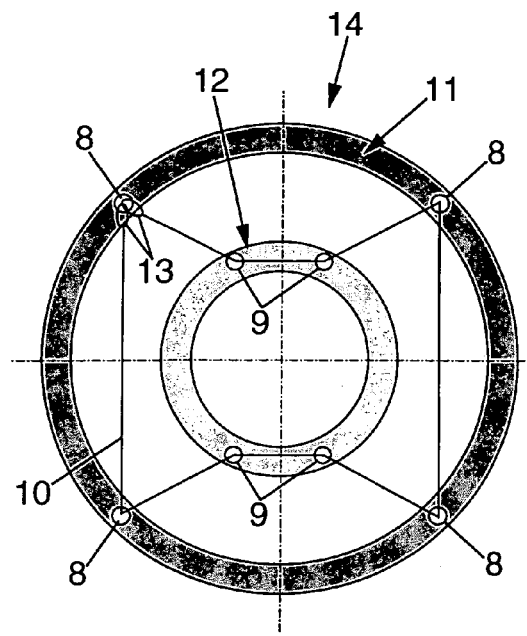
Figure 2B:
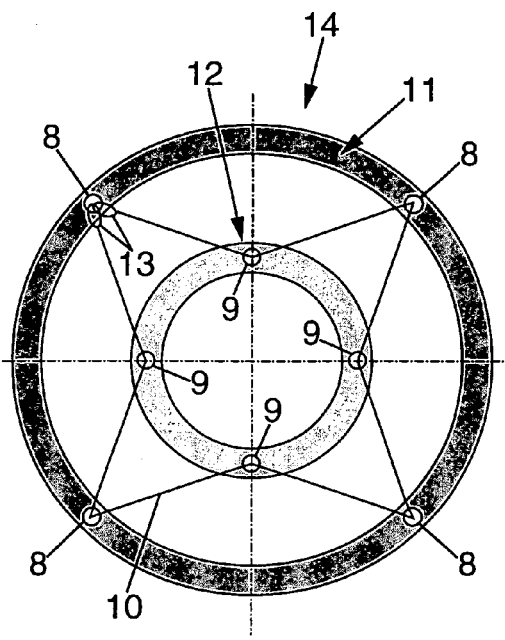
Figure 2C:
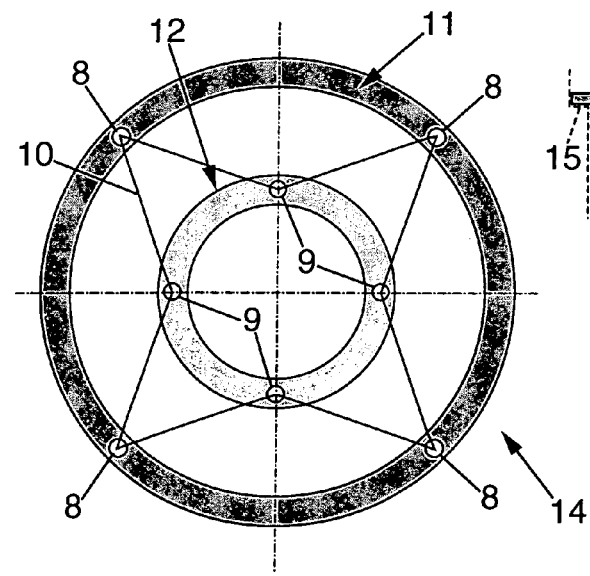
Figure 3:
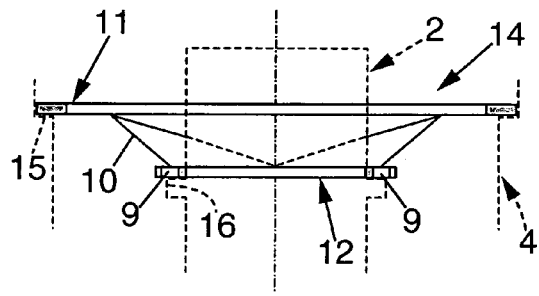

FIGS. 2A, 2B, and 2C are respective plan views of a variety of variants of a preferred embodiment constituting practical implementations of the dispositions shown in FIGS. 1A and 1B; and FIG. 3 is a side view of a preferred embodiment of FIGS. 2A, 2B, and 2C, shown in the assembled situation.

DETAILED DESCRIPTION OF THE INVENTION

With reference initially to FIGS. 1A and 1B, a cooled cryostat device given overall reference 1 comprises:

a cold finger 2 having infrared detector means 3 secured to the end thereof, i.e. an infrared detector together with accessories therefor (screens, baffles, filters, . . . )

an outer casing 4 surrounding said cold finger 3 and including a window 6 situated facing the detector means 3 and lying on the same axis as the detector means (reference 7 designating the common or aiming axis); and stiffener means 5 for stiffening the cold finger 3 and interposed between the outer casing 4 and the cold finger 3 in the vicinity of the top or free end thereof.

In accordance with the invention, provision is made for the stiffener means 5 to comprise:

first eyelets 8 situated on the inside of the casing 4 and distributed around the periphery thereof;

second eyelets 9 provided on the outside of the cold finger 3 and distributed around the periphery thereof;

the first and second eyelets 8 and 9 being mutually angularly offset; and a flexible link or cable 10 tensioned around a closed loop between the outer casing 4 and the cold finger 2, and passing freely through the first and second eyelets 8 and 9.

In the example shown in FIG. 1B, the first and second eyelets are both four in number and they are disposed symmetrically: the four first eyelets are angularly offset at about 90°, and the four second eyelets are angularly offset at about 90°, with the first and second eyelets being mutually angularly offset by about 45°; nevertheless, as explained more clearly below, this is not the only possible arrangement.

By using a continuous cable 10 relative to which the cold finger 2 can move during tensioning, it is possible to ensure that the tensions in each of the strands of the cable 10 are balanced almost automatically, since the strands forming the stays are no longer independent from one another, but are secured to one another and can slide relative to the cold finger 2.

Once balancing has been achieved and the cold finger 2 is held properly coaxially on the axis 7, the cable 10 is secured to the casing 4 and to the cold finger 2, e.g. by adhesive or by soldering or welding so that the assembly remains stable.

In a preferred embodiment shown in FIGS. 2A, 2B, and 2C, the first eyelets belong to a first ring 11 that can be secured to the inside of the outer casing 4, and the second eyelets 9 belong to a second ring 12 that can be secured around the cold finger 2.

This general arrangement can give rise to numerous variant embodiments.

Thus, FIG. 2A shows the eyelets 8 of the first ring 11 being four in number and angularly distributed in substantially equidistant manner, while the eyelets 9 of the second ring 12 are likewise four in number but are moved close to each other in pairs; the cable 10, e.g. secured at one of its ends to one of the eyelets 8, extends to the second ring where it passes consecutively through two close-together eyelets 9, and then extends to the first ring 11 where it passes consecutively through two successive eyelets 8, and then passes again to the second ring 12 where it passes consecutively through the other two close-together eyelets 9, and finally extends to the first ring 11 where it passes consecutively through the other two successive eyelets 8 so that its end can be secured to the starting eyelet 8. The fastening of the ends of the cable 10 to the eyelet 8 is represented by two small loops 13.

In FIG. 2B, the eyelets 8 of the first ring 11 are four in number and they are angularly distributed in equidistant manner, and the eyelets 9 of the second ring 12 are likewise four in number and are likewise angularly distributed in equidistant manner, the two rings 11 and 12 being mutually angularly offset. The cable 10 which has one end secured (loop 13) to one of the eyelets 8 then passes between the two rings, passing in alternation through the eyelets 8 and 9 until reaching its other end which is secured (small loop 13) to the starting eyelet 8, the cable in this example taking up the configuration of a four-pointed star.

In FIG. 2C, the arrangement is identical to that of FIG. 2B, except that the ends of the cable 10 are no longer secured to one of the eyelets 8, but are secured to each other in such a manner as to provide continuity in the shape and the mechanical strength of the cable 10: the cable thus becomes completely free to slide relative to the two rings 11 and 12.

FIG. 3 is a side view in diametral section, through any one of the variant embodiments shown in FIGS. 2A, 2B, and 2C.

The general arrangement with two rings 11 and 12 as described above presents the very significant advantage that the two rings 11 and 12 and the cable 10 that unites them can form a subassembly 14 that is preassembled prior to being mounted in the device. This simplifies manufacture and then assembly: the subassembly 14 as made in this way is installed in the cryostat with the outer ring 11 secured to the inside face of the outer casing 4 of the cryostat and with the inner ring 12 secured around the cold finger 2, as suggested in FIG. 3 where the casing 4 and the cold finger are represented in part by dashed lines. The positioning of the two rings 11 and 12 during assembly can be made easier by providing respective shoulders 15 and 16 on the casing 4 and the cold finger 2, as shown in FIG. 3.

The respective positions of the two rings 11 and 12 relative to the longitudinal axis 7 of the cryostat determine the tension in the cable 10. Tensioning is thus performed at the time of assembly. Because the cable can slide freely through the eyelets 8 and 9, the tension between the various stays or "spokes" reaches balanced equilibrium.

After the two rings 8 and 9 have been put into place so as to ensure that the cable 10 is in balanced equilibrium, it is necessary to prevent the cable 10 from moving at a few points, e.g. with spots of solder or adhesive (not shown).

The rings 11 and 12 can be secured to their respective supports in any suitable manner. In particular, provision can be made for the first and/or the second ring 11 and 12 to be made as metal and to be welded or brazed to the inside of the outer casing 4 or onto the outside of the finger 2. It is also possible to make provision for the first and/or second ring 11, 12 to be bonded to the outer casing 4 or the inner finger 2 by means of adhesive.

The rings 11 and 12 are simple mechanical parts that can be made at very low cost (stamping metal, sintering ceramic, . . . ) and they can be relatively complex in shape. Numerous types of eyelet (crimped in, welded on) can be used for securing the cable 10 to the rings, that are commercially available, or that can be produced at low cost and without technical difficulty.

In addition, provision can be made for the inner ring 12 for fitting on the cold finger 2 to be worked so as to minimize its mass and/or for it to be used to perform other functions (cable relay holder, cold screen support, . . . ) in order to limit or indeed reduce the total thermal mass.

The cable 10 may be made of metal (e.g. steel, pure titanium, TA6V4 titanium alloy, nickel, molybdenum, . . . ) or else of synthetic material, e.g. out of polymer materials (polyaramides such as those sold under the names of Kevlar or Nomex, . . . ), or out of composites, materials that generally present very low thermal conductivity and good mechanical properties. In addition, the cable 10 may have a diameter that is very small, lying in the range a few tenths of a millimeter up to 0.025 mm for metals (in particular when using surgical wire or electroerosion wire) and up to a few tenths of a millimeter for polymers and composites, whether as a single strand or as a braid, of section that can be round, flat . . . .

Since the stiffener subassembly 14 interconnects a hot portion (the casing 4 of the cryostat) and a portion (the cold finger 2) which is cold or hot depending on whether the cryostat is or is not in operation, the tension in the spokes defined by the cable 10 can be modified by differential expansion of the respective component materials. This phenomenon can be used to advantage to increase stiffness when lowering temperature, since the shortening of the cold finger 2 under the effect of lowering its temperature will lead to an increase in the tension in the cable.

What is claimed is:

1. A cooled cryostat device comprising:
    a cold finger;
    an infrared detector means secured to a terminus of said cold finger;
    an outer casing surrounding said cold finger;
    a stiffener means for stiffening said cold finger, said stiffener means interposed between said outer casing and said cold finger in the vicinity of said terminus,
    wherein said stiffener means comprises:
        first eyelets distributed around the periphery of a first ring, wherein said first ring is attachable by a first securing means to the inside of said outer casing;
        second eyelets distributed around the periphery of a second ring, wherein said second ring is attachable by a second securing means to the outside of said cold finger;
        said first eyelets and said second eyelets being mutually angularly offset; and
    a cable, passing freely through said first and second eyelets, said cable, once said cold finger has been placed in a balanced situation, being secured under tension, to provide radial support, as a closed loop to said first ring and said second ring.

2. A device according to claim 1, wherein one or both of said first ring and said second ring is made of metal and wherein one or both of said first or second securing means is by weld or solder.

3. A device according to claim 1, wherein one or both of said first or second securing means is bonding by adhesive.

4. A device according to any one of claims 1 to 3, wherein said cable is made of metal.

5. A device according to any one of claims 1 to 3, wherein said cable is made of synthetic material.

6. A device according to claim 1 wherein said cable passes through said first eyelets and said second eyelets in alternation.

* * * * *